Oct. 17, 1967  C. F. SHIELDS  3,347,125
KNIFE BLADE GUIDE FOR A CLOTH CUTTING MACHINE
Filed Oct. 22, 1965

INVENTOR
Charles F. Shields
BY
Wood, Herron & Evans
ATTORNEYS

United States Patent Office 3,347,125
Patented Oct. 17, 1967

3,347,125
KNIFE BLADE GUIDE FOR A CLOTH
CUTTING MACHINE
Charles F. Shields, Newport, Ky., assignor to The Wolf Machine Company, Cincinnati, Ohio, a corporation
Filed Oct. 22, 1965, Ser. No. 502,129
1 Claim. (Cl. 83—635)

ABSTRACT OF THE DISCLOSURE

An improvement for a cloth cutting machine that includes a knife blade, a knife blade guide, means for reciprocating the knife blade, a standard, and a base, the improvement comprising a toe integral with each guide side that extends forwardly to the leading edge of the knife blade, the toe being structurally founded on the base, and a slot in the base into which the knife blade reciprocates, the slot flaring outwardly into a notch from the terminus of the toes.

This invention relates to a cloth cutting machine having a reciprocating knife blade and, more particularly, to a knife blade guide for promoting a clean cut in all sheets of a stack of cloth sheets when cut by the cloth cutting machine.

Cloth cutting machines which employ the reciprocating knife blade principle are widely used and well known in the art. A cloth cutting machine normally includes a knife blade, a blade reciprocating mechanism to vertically reciprocate the blade, a motor to drive the blade reciprocating mechanism, a base having a slot into which the blade reciprocates, and a vertical standard to support the blade, motor and blade reciprocating mechanism on the base.

In the present state of the art, the rear edge portion of the knife blade is recessed in the standard to provide support for the blade during its vertical reciprocative movement when cutting through the stack of cloth sheets. As the blade reciprocates, the base end thereof, which has a cutting edge equivalent to that on the vertical leading edge of the blade, alternately enters into and exits from the slot in the base. This reciprocative action of the base end of the blade into and out of the base given rise to operation problems which greatly limit the effective use of such cloth cutting machines in certain instances. Namely, when cutting a loosely woven or piled fabric the material tends to be jammed into the slot in the base of the machine by the base end of the blade on its downward stroke. That is to say, when the base end of the blade gets the least bit dull it tends to pull threads or bits of the cloth goods into the slot in the base of the machine on its downward stroke. Of course, when a sufficient buildup of material occurs in the slot the blade tends to bind in the slot, thus providing mechanical operational problems. In addition, the blade tends to tear and fray the sheets of cloth on the base of the machine, i.e., at the base of the stack, instead of providing a clean cut through the entire stack of cloth when this condition arises.

The present invention satisfactorily solves the aforementioned problems by providing a knife blade guide having a channel-like appearance which cooperates with the base end of the knife blade to provide a cutting-shearing action as the blade enters the slot in the base. The trailing edge of the knife blade is received in slidable relationship with the guide and the guide is substantially recessed in the vertical standard to provide the required support for the knife blade. At the open side of the channel, the longitudinal or leading edges of both sides of the blade guide are beveled inwardly. At a point above the right angled intersection of the standard and the base of the machine, the leading edges of the blade guide commence to curve or flare outwardly, while continuing downward, in a concave manner. The flared or concave edges are also inwardly beveled. Subsequently, the leading edges of the guide terminate in the base at a point relatively distant from the intersection of the standard and the base. Thus, toes are formed at the base end of the guide which have beveled leading edges and which are extensions of the sides of the guide.

In operation, the base end of the blade gradually encounters the terminus of its cutting stroke as it approaches the end of its downward travel and a shearing action is created between the blade and the beveled leading edges of the curved end of the knife blade guide. In addition, the beveled, curved leading edges at the base end of the guide present additional cutting edges to the bottom sheets in the stack of cloth being cut. That is to say, because of the combined cutting and shearing action generated by the cooperation of the base end of the knife blade with the curved or flared toe of the guide device, as the blade approaches the end of its downward stroke, the problems which were described above are satisfactorily solved.

Accordingly, it has been an objective of this invention to provide a device whereby the tearing or fraying of the bottom sheets of a stack of cloth sheets being cut by a cloth cutting machine of the reciprocable knife blade type may be prevented.

It has been another objective of this invention to provide a device of the type above set forth whereby material from loosely woven or piled fabrics will not be jammed or pulled into the slot which receives the reciprocating knife blade in the base of a cloth cutting machine.

It has been a further objective of this invention to provide a device whereby a combined cutting and shearing action may be effected by the base end of a knife blade on sheets of cloth at the base of a stack as the base end of the blade enters into a slot in the base of a cloth cutting machine, thereby providing a cleaner cut and preventing the binding of the blade in the slot.

The further objects and advantages of the present invention will be apparent from the following description, reference being made to the accompanying drawings wherein a preferred embodiment of the invention is described.

Figure 1:
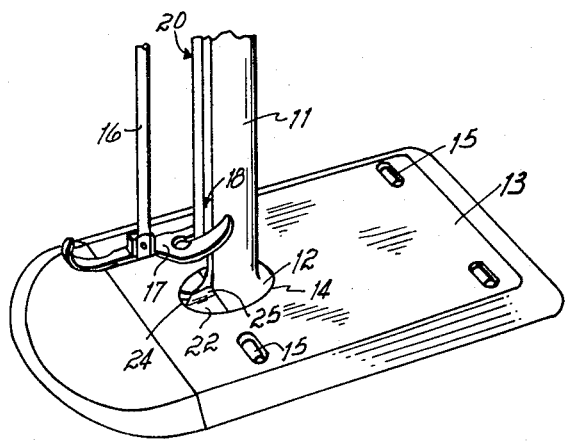
FIG. 1 is a perspective view of the bottom portion of a cloth cutting machine incorporating the preferred embodiment of this invention.

The portion of a cloth cutting machine where the operational problems arise that are mitigated by this invention is generally depicted in FIG. 1. In this area of the machine there is a vertical standard 11 integrally formed with a plate 12. A horizontal base 13 has an aperture 14 for receiving the plate 12 in a rear portion thereof such that the standard 11 and the base 13 are interrelated. The base 13 may have spring rollers 15 attached thereto for mobility purposes. Associated with the standard 11 is a vertically adjustable shaft 16 which carries a presser foot 17.

Figure 2:
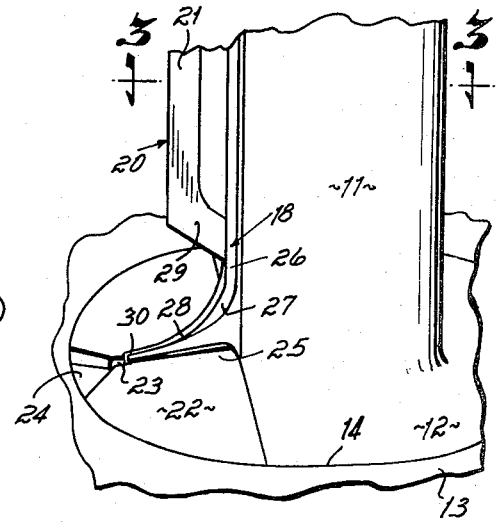
FIG. 2 is an enlarged view of the intersection of the standard and the base depicting the preferred embodiment.
Figure 3:
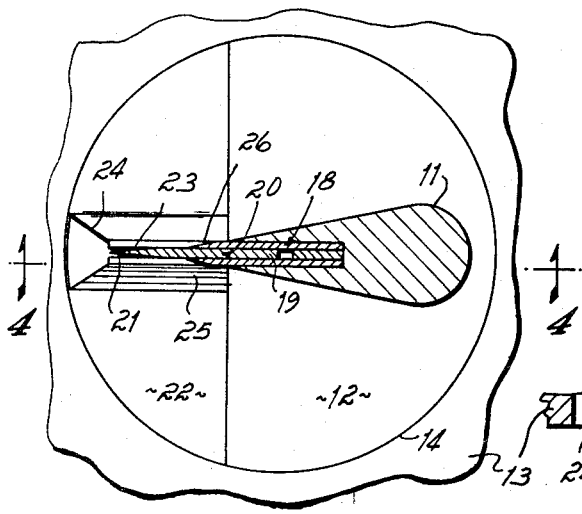
FIG. 3 is a cross-sectional view taken along line 3—3 of FIG. 2.
Figure 4:
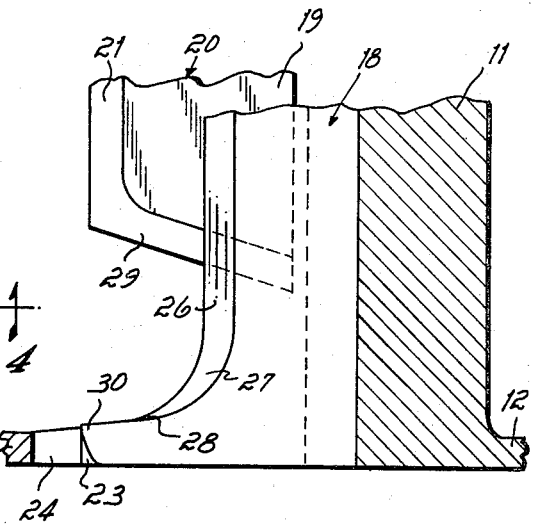
FIG. 4 is a cross-sectional view taken along line 4—4 of FIG.3.

As best seen in FIGS. 2–4, the vertical standard 11, which is shaped in cross section like a tear drop, receives a knife blade guide 18 in the angular or leading edge thereof, the guide being secured within the standard by means not shown, such that the base of the guide is within the standard. The trailing edge 19 of a knife blade 20 is closely fitted in the blade guide 18 yet maintains enough freedom such that vertical reciprocative movement of the blade 20 is possible. It will be noted that the blade 20 has knife edges on its leading edge 21 as well as on its base end 29. Within the front portion of the aperture 14 is an insert 22 having a slot 23 therein which flares outwardly into a notch 24 as it approaches the edge of the aperture 14. The slot 23 is aligned with the knife blade guide 18 and is of dimensions such that toes 25 of the guide 18 may be received with a close fit therein.

The knife blade guide 18 is channel-like in shape with the leading edges 26 of its sides being beveled inwardly. At a point above the right angled intersection of the standard 11 and the plate 12, the beveled leading edges 26 of the guide 18 commence to curve or flare outwardly or away from the standard, as at 27, while continuing downward toward the base 13, thus forming concave transition edges from the edges 26 to the upper edges 30 of the toes 25. It will be noted from FIG. 4 that the length of the toe 25 plus the length of the side of the guide 18 is not substantially greater than the width of the knife blade 20. At a point relatively distant from the intersection of the standard 11 and the plate 12, as at 28, the beveled edges 26 terminate, the top edges of the toes 25 of the guide 18 blend into the surface of the insert 22, and the sides of the toes continue into the slot 23. The toes 25, as previously mentioned, are held within the slot 23 for structural rigidity purposes.

As can best be seen from FIG. 3, the combination of the leading edges of the knife blade 20, the beveled knife guide 18 and the tear drop shaped standard 11 presents a streamlined profile to the stack of cloth goods to be cut, thus providing for easy movement of the cutting machine therethrough. As can best be seen in FIG. 4, the beveled, curved area 27, 28 of the leading edge of the knife guide 18 essentially acts as an additional knife edge. As the base end 29 of the blade 20 passes therethrough on its downward stroke the cooperation between the knife edge 29 and the beveled, curved transition edges 27, 28, which cooperation forms a combined cutting-shearing action, is sufficient to cut the bottom sheets of cloth in the stack, instead of tearing or fraying them, and to keep loosely woven or piled material from being jammed into the slot 23.

It will be understood that various modifications may be made in the design and structure of the preferred embodiment heretofore described without departing from the scope of the invention.

What I desire to claim and protect by Letters Patent is:

In a cloth cutting machine having a base plate, a standard rising from said base plate, a motor atop said standard, a vertical slot in said standard, liners at the sides of said vertical slot, a knife adapted to reciprocate vertically between said liners, and said knife having a cutting edge projecting substantially outwardly beyond said liners, the improvement comprising a toe portion at the lower end of each liner, said toe portion extending outwardly and terminating adjacent to the line of the cutting edge of said knife, there being a radius for each toe extending through 90° to present a concave edge outwardly and upwardly, a first slot portion in said base dimensioned to receive the lower ends of said liners including said toe portions, a second slot portion in said base joining and immediately outwardly of said first slot portion, and said second slot portion flaring outward from said toe portions and extending completely through said base plate to permit lint collected as a result of cutting operations free passage to the underside of said base plate.

References Cited

UNITED STATES PATENTS

| | | | |
|---|---|---|---|
| 590,140 | 9/1897 | Eastman | 30—273 |
| 2,496,365 | 2/1950 | Aaron | 30—273 |
| 2,937,442 | 5/1960 | Beaver. | |

FOREIGN PATENTS 828,874   2/1960   Great Britain.

WILLIAM W. DYER, Jr., *Primary Examiner.*

JAMES M. MEISTER, *Examiner.*